(12) United States Patent
Nishimura

(10) Patent No.: US 12,371,035 B2
(45) Date of Patent: Jul. 29, 2025

(54) CONTROL APPARATUS FOR VEHICLE

(71) Applicant: TOYOTA JIDOSHA KABUSHIKI KAISHA, Toyota (JP)

(72) Inventor: Yukimasa Nishimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 18/501,130

(22) Filed: Nov. 3, 2023

(65) Prior Publication Data

US 2024/0149893 A1    May 9, 2024

(30) Foreign Application Priority Data

Nov. 4, 2022   (JP) .................. 2022-177679

(51) Int. Cl.
*B60W 50/029* (2012.01)
*B60W 10/08* (2006.01)
*B60W 10/10* (2012.01)

(52) U.S. Cl.
CPC .......... *B60W 50/029* (2013.01); *B60W 10/08* (2013.01); *B60W 10/10* (2013.01); *B60W 2050/0292* (2013.01); *B60W 2710/081* (2013.01)

(58) Field of Classification Search
CPC ...... B60W 10/08; B60W 10/10; B60W 10/11; B60W 50/029; B60W 2050/0292; B60W 2710/081
See application file for complete search history.

(56) References Cited

U.S. PATENT DOCUMENTS

2019/0135269 A1    5/2019   Suzuki et al.

FOREIGN PATENT DOCUMENTS

| JP | 2004306826 A | * | 11/2004 | |
| JP | 3788160 B2 | * | 6/2006 | ............. F16H 61/12 |
| JP | 3820643 B2 | * | 9/2006 | |
| JP | 2017197023 A | | 11/2017 | |

* cited by examiner

*Primary Examiner* — Edwin A Young
(74) *Attorney, Agent, or Firm* — Hunton Andrews Kurth LLP

(57) ABSTRACT

A control apparatus for a vehicle that includes a drive wheel, an engine and an electric motor as power sources for driving the vehicle, and an automatic transmission which is provided in a power transmission path between the power sources and the drive wheel and which is configured to selectively establish a plurality of gear positions providing respective different gear ratios. The control apparatus includes a limp-home-running control portion configured, in event of a failure of the engine, to cause the vehicle to perform a limp-home running, by operating the electric motor with a power supplied from a power storage device. The limp-home-running control portion is configured, when causing the vehicle to perform the limp-home running, to restrict shifting of the automatic transmission for changing the gear positions of the automatic transmission.

3 Claims, 6 Drawing Sheets

| GEAR POSITION | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |
| N |  |  |  |  |  |  |

(○:ENGAGED  BLANK:RELEASED)

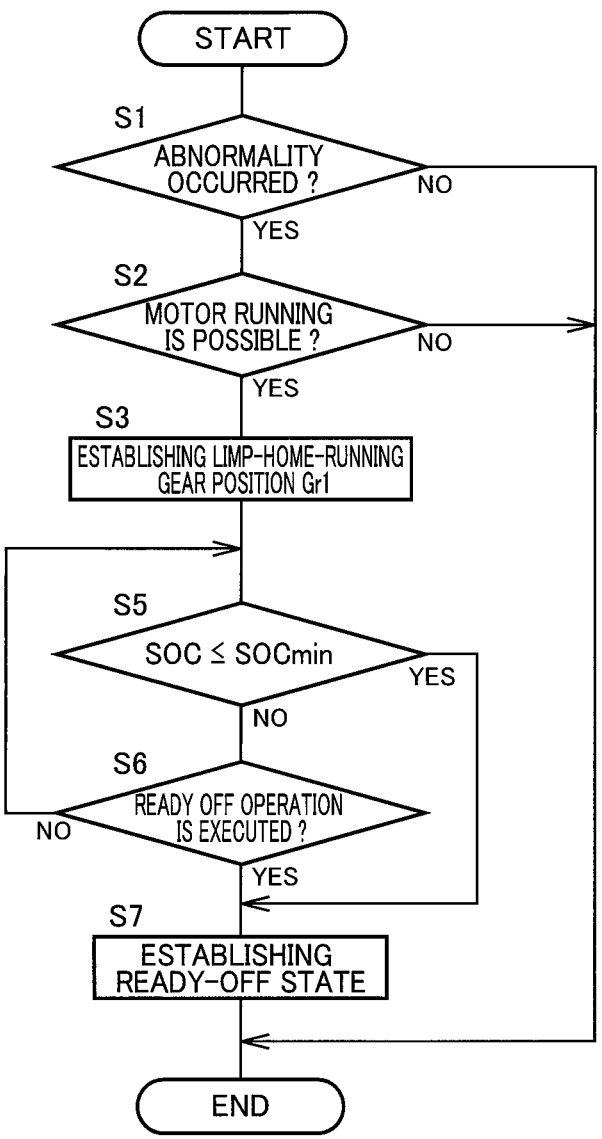

CONTROL APPARATUS FOR VEHICLE

This application claims priority from Japanese Patent Application No. 2022/177679 filed on Nov. 4, 2022, the disclosure of which is herein incorporated by reference in its entirety.

FIELD OF THE INVENTION

The present invention relates to a control apparatus for a vehicle, and more particularly to a technique for operating an electric motor by an electric power supplied from a power storage device to cause the vehicle to perform a limp-home running in event of a failure of an engine.

BACKGROUND OF THE INVENTION

There is known a vehicle including an engine and an electric motor as power sources for driving the vehicle, and an automatic transmission which is provided in a power transmission path between the power sources and a drive wheel and which is configured to selectively establish a plurality of gear positions providing respective different gear ratios (see Patent Document 1). In such a vehicle, it is conceivable that the electric motor is operated by the electric power supplied from a power storage device to cause the vehicle to perform a limp-home running in event of a failure of the engine.

PRIOR ART DOCUMENT

Patent Document

[Patent Document 1]
Japanese Patent Application Laid-Open No. 2017-197023

SUMMARY OF THE INVENTION

However, when the automatic transmission is shifted to change the gear positions during such a limp-home running, consumption of the electric power is increased due to a control of a rotational speed of the electric motor for suppressing a shifting shock or the like, so that there is a possibility that a cruising distance could be reduced.

The present invention has been made in view of the above-described circumstances, and an object of the present invention is to suppress a reduction of the cruising distance due to the power consumption caused by shifting of an automatic transmission when an electric motor is operated by an electric power suppled from a power storage device to cause the vehicle to perform a limp-home running.

According to a first aspect of the present invention, there is provided a control apparatus for a vehicle that includes a drive wheel, an engine and an electric motor as power sources for driving the vehicle, and an automatic transmission which is provided in a power transmission path between the power sources and the drive wheel and which is configured to selectively establish a plurality of gear positions providing respective different gear ratios. The control apparatus includes a limp-home-running control portion configured, in event of a failure of the engine, to cause the vehicle to perform a limp-home running, by operating the electric motor with a power supplied from a power storage device. The limp-home-running control portion is configured, when causing the vehicle to perform the limp-home running, to restrict shifting of the automatic transmission for changing the gear positions of the automatic transmission.

According to a second aspect of the present invention, in the control apparatus according to the first aspect of the present invention, the limp-home-running control portion is configured, when causing the vehicle to perform the limp-home running, to cause the vehicle to run with a limp-home-running gear position as a predetermined constant gear position being established in the automatic transmission.

According to a third aspect of the present invention, in the control apparatus according to the first aspect of the invention, the vehicle includes a hydraulic control circuit having a mechanical hydraulic pump to be driven by the electric motor and an electric hydraulic pump to be driven by a pump drive motor that is provided exclusively for driving the electric hydraulic pump. The limp-home-running control portion is configured, when a running speed of the vehicle is higher than a predetermined low-speed determination value during the limp-home running, to cause the vehicle to run with a limp-home-running gear position as a predetermined constant gear position being established in the automatic transmission. The limp-home-running control portion is configured, when the running speed of the vehicle becomes not higher than the predetermined low-speed determination value during the limp-home running, to downshift the automatic transmission to a low-speed gear position as another predetermined constant gear position providing a higher gear ratio than the limp-home-running gear position.

In the control apparatus described above, during the limp-home running in which the vehicle runs by operating the electric motor with the power supplied from the power storage device, the shifting of the automatic transmission is restricted, so that it is possible to reduce the power consumption caused by a control of a rotational speed of the electric motor for suppressing a shifting shock or the like, and accordingly to extend a cruising distance of the vehicle by an amount corresponding to the reduction of the power consumption. Where the limp-home-running gear position as the predetermined constant gear position is fixedly established in the automatic transmission during the limp-home running, as in the second aspect of the present invention, the power consumption caused by the shifting of the automatic transmission is reduced, and the cruising distance can be appropriately extended.

In the control apparatus according to the third aspect of the present invention, the vehicle includes the hydraulic control circuit having the mechanical hydraulic pump and the electric hydraulic pump. When the running speed of the vehicle is higher than the low-speed determination value, the vehicle runs with the automatic transmission being fixed to the limp-home-running gear position as the predetermined constant gear position. Therefore, it is possible to reduce the power consumption due to the control of the rotational speed of the electric motor at the time of the shifting of the automatic transmission, and to extend the cruising distance. On the other hand, when the vehicle running speed becomes not higher than the low-speed determination value, the automatic transmission is downshifted to a low-speed gear position providing a gear ratio higher than that of the limp-home-running gear position, whereby a rotational speed of the electric motor is increased by the downshifting of the automatic transmission in spite of a low running speed of the vehicle, so that it is possible to increase an amount of a working fluid discharged by the mechanical hydraulic pump that is rotationally driven by the electric motor. As a result, the operation of the electric hydraulic pump can be suppressed by the increase of the amount of the working fluid discharged by the mechanical hydraulic pump, so that

BRIEF DESCRIPTION OF THE DRAWINGS

FIG. 8 is a flowchart for explaining another embodiment of the present invention, wherein the flowchart corresponds to that of FIG. 5.

DETAILED DESCRIPTION OF PREFERRED EMBODIMENT

The present invention is applied to a hybrid electric vehicle including an engine and an electric motor as power sources. As the electric motor, a motor generator that functions also as a generator is preferably used, but an electric motor that does not function as a generator can also be used. Although an automatic transmission is provided in a power transmission path between the power source and the drive wheel, a fluid transmission device such as a torque converter may be provided as necessary. As the automatic transmission, a stepped transmission of a planetary gear type, a two-shaft meshing type or the like is suitable, but even a continuously variable transmission of a belt type or the like can be applied in a case in which the gear ratio is changed stepwise like in the stepped transmission. The limp-home-running control portion is configured to cause the vehicle to run with the automatic transmission being fixed to the predetermined limp-home-running gear position, for example. However, the limp-home-running control portion may be configured to execute a shift control such that frequency of the shifting is reduced, for example, by reducing the number of gear positions that are to be switched.

Embodiments of the present invention will be described in detail below with reference to the drawings.

Figure 1:
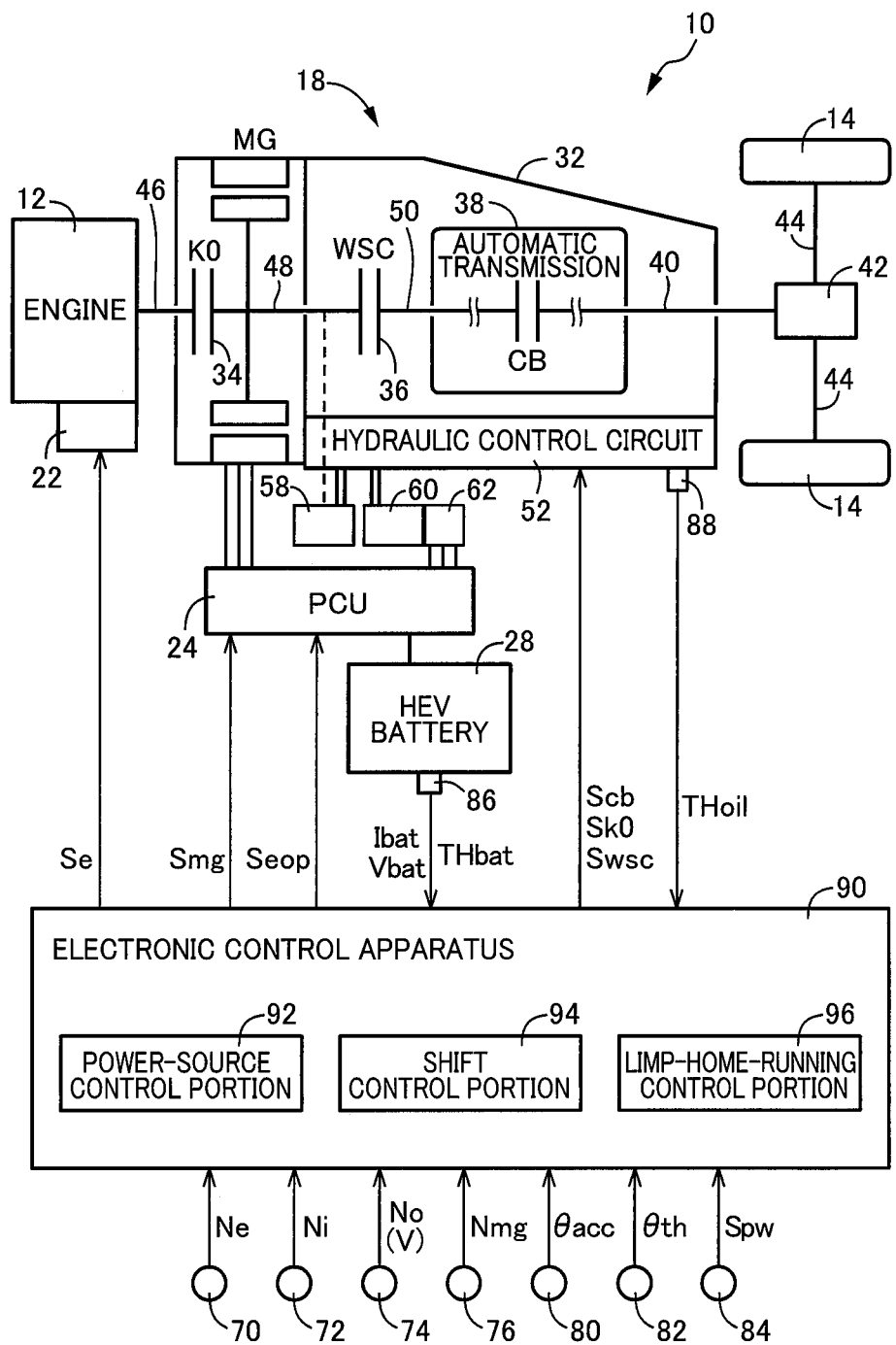
FIG. 1 is a schematic configuration view showing a vehicle drive system including an electronic control apparatus according to an embodiment of the present invention.

FIG. 1 is a view showing a schematic configuration of a drive system of a vehicle 10 including an electronic control apparatus 90 as a control apparatus according to an embodiment of the present invention, and is a view showing a control function and a main part of a control system for various controls in the vehicle 10. The vehicle 10 is a hybrid electric vehicle that includes an engine 12 and an electric motor MG as power sources. The vehicle 10 includes the engine 12, drive wheels 14 that are right and left rear or front wheels, and a power transmission apparatus 18 provided in a power transmission path between the engine 12 and the drive wheels 14. The engine 12 is an internal combustion engine such as a gasoline engine or a diesel engine. In the engine 12, an engine control device 22 including a throttle actuator, a fuel injection device and an ignition device is controlled by the electronic control apparatus 90, such that an engine torque Te that is a torque of the engine 12 is controlled. The electric motor MG is a rotary electric machine having a function as a motor that generates a mechanical power from an electric power and a function as a generator that generates the electric power from the mechanical power, and is a so-called motor generator. The electric motor MG is connected to a high-voltage HEV (hybrid electric vehicle) battery 28 via a PCU (power control unit) 24 having an inverter or the like. The PCU 24 of the motor MG is controlled by the electronic control apparatus 90, such that the MG torque Tmg that is a torque of the electric motor MG is controlled. The HEV battery 28 is a power storage device that supplies the electric power to the electric motor MG.

The power transmission apparatus 18 includes a K0 clutch 34, a WSC clutch 36 and an automatic transmission 38 that are arranged in series in this order from side of the engine 12 inside a casing 32 as a non-rotary member attached to a body of the vehicle 10, such that the power is transmitted from a transmission output shaft 40 to the drive wheels 14 via a differential gear device 42 and a pair of drive shafts 44. The K0 clutch 34 is an engagement device that is configured to connect and disconnect the engine 12 and the electric motor MG to and from each other, and serves as an engine connection/disconnection clutch that is configured to disconnect the engine 12 from the power transmission path. The WSC clutch 36 is another engagement device that is configured to connect and disconnect the electric motor MG and the drive wheels 14 to and from each other, and serves as a starting clutch or an input clutch by being slip-engagement controlled by the electronic control apparatus 90.

The power transmission apparatus 18 includes an engine connection shaft 46 that connects the engine 12 and the K0 clutch 34, and a motor connection shaft 48 that connects the K0 clutch 34 and the WSC clutch 36. The electric motor MG is connected to the motor connection shaft 48 in a power transmittable manner. Each of the K0 clutch 34 and the WSC clutch 36 is a wet-type or dry-type frictional engagement device constituted by a multi-plate clutch or a single-plate clutch that is pressed by a hydraulic actuator, and is to be switched between operation states such as an engaged state and a released state by the electronic control apparatus 90. The operation state of the K0 clutch 34 is switched when a K0 torque Tk0, which is a torque capacity of the K0 clutch 34, is changed by a K0 hydraulic pressure PRk0 supplied from a hydraulic control circuit 52. The operation state of the WSC clutch 36 is switched by when a WSC torque Twsc, which is a torque capacity of the WSC clutch 36, is changed by a WSC hydraulic pressure PRwsc supplied from the hydraulic control circuit 52. An input side member of the WSC clutch 36 is connected to the motor connection shaft 48, and an output side member of the WSC clutch 36 is connected to a transmission input shaft 50 that is an input rotary member of the automatic transmission 38.

The automatic transmission 38 is, for example, a known planetary-gear-type automatic transmission including a plurality of planetary gear devices and a plurality of engagement devices CB. Each of the engagement devices CB is a hydraulic friction engagement device including, for example, a multi-plate or single-plate clutch or brake that is to be pressed by a hydraulic actuator, a band brake that is to be tightened by a hydraulic actuator, or the like. A CB torque Tcb, which is a torque capacity of each of the plurality of engagement devices CB, is changed by the regulated CB hydraulic pressure PRcb supplied from the hydraulic control circuit 52, whereby an operation state of each of the engagement devices CB is switched between an engaged state and a released state. The automatic transmission 38 is a stepped transmission that establishes one of a plurality of gear positions Gr providing respective different gear ratios γat (=input rotational speed Ni/output rotational speed No) by engaging at least one of the engagement devices CB. The input rotational speed Ni is a rotational speed of the transmission input shaft 50 and is an input rotational speed of the automatic transmission 38. The input rotational speed Ni is also a rotational speed of the output-side member of the WSC clutch 36. The output rotational speed No is a rotational speed of the transmission output shaft 40, and is an output rotational speed of the automatic transmission 38.

The vehicle 10 includes a mechanical hydraulic pump 58 and an electric hydraulic pump 60. The mechanical hydraulic pump 58 is connected to, for example, the motor connection shaft 48 via a transmission device such as a gear, a belt and a chain in a power transmittable manner, so as to be rotationally driven by at least one of the engine 12 and the electric motor MG, for thereby discharging a working fluid used in the power transmission apparatus 18. The electric hydraulic pump 60 is to be rotationally driven by a pump drive motor 62 to discharge the working fluid, and can discharge the working fluid at any time including even when the vehicle 10 is stopped. In the present embodiment, the pump drive motor 62, which serves exclusively for the electric hydraulic pump 60, is operated by the electric power supplied from the high-voltage HEV battery 28 via the PCU 24, like the electric motor MG. However, the pump drive motor 62 may be operated also by the electric power supplied from a low-voltage normal battery of 12V, for example. The working fluid discharged from the mechanical hydraulic pump 58 and the electric hydraulic pump 60 is supplied to the hydraulic control circuit 52. The hydraulic control circuit 52 outputs the CB hydraulic pressure PRcb, the K0 hydraulic pressure PRk0, the WSC hydraulic pressure PRwsc and the like, which are regulated based on the working fluid supplied from the mechanical hydraulic pump 58 and the electric hydraulic pump 60.

Figures 2, 3:
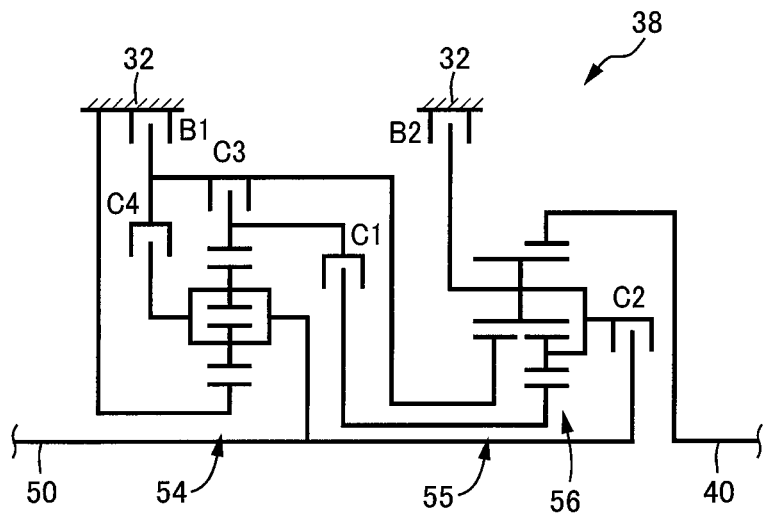
FIG. 2 is a view showing an example of an automatic transmission included in a vehicle shown in FIG. 1.
FIG. 3 is a table for explaining a relationship between a plurality of gear positions and engagement devices of the automatic transmission of FIG. 2.

FIG. 2 is a schematic view showing an example of the automatic transmission 38. The automatic transmission 38 includes three sets of planetary gear devices 54, 55, 56, four clutches C1 to C4 and two brakes B1, B2. The clutches C1 to C4 and the brakes B1, B2 correspond to the engagement devices CB and are hydraulic frictional engagement devices that are to be engaged by hydraulic actuators. When the engagement devices CB are engaged in accordance with the "O" marks in an engagement operation table shown in FIG. 3, eight forward gear positions consisting of a first speed gear position "1st" to an eighth speed gear position "8th" are established as the plurality of gear positions Gr, and a reverse gear position "Rev" is established. When all the engagement devices CB are released, a neutral position "N" in which the power transmission is interrupted is established. The first speed gear position "1st" is a low-speed gear position having the highest gear ratio γat, and the gear ratio γat is reduced from the first speed gear position "1st" toward the eighth speed gear position "8th". The automatic transmission 38 is constructed substantially symmetrically with respect to a center line, and its lower half located on a lower side of the center line is not shown in FIG. 2, and the transmission input shaft 50 and the transmission output shaft 40 are shown on the center line.

The vehicle 10 includes an electronic control apparatus 90 as a control apparatus configured to execute various control. The electronic control apparatus 90 includes a so-called microcomputer including, for example, a CPU, a RAM, a ROM and an input/output interface, and is configured to execute the various controls in the vehicle 10. The electronic control apparatus 90 includes a plurality of computers for an engine control, an MG control, a hydraulic pressure control and the like as necessary.

The electronic control apparatus 90 is configured to receive various information necessary for the various controls, for example, from an engine speed sensor 70, an input speed sensor 72, an output speed sensor 74, an MG speed sensor 76, an accelerator-opening degree sensor 80, a throttle-opening degree sensor 82, a power switch 84, a battery sensor 86 and a fluid temperature sensor 88, for example, wherein the various information include an engine rotational speed Ne that is a rotational speed of the engine 12, an input rotational speed Ni, an output rotational speed No corresponding to a running speed V of the vehicle 10, an MG rotational speed Nmg that is a rotational speed of the electric motor MG, an accelerator opening degree θacc which is an amount of operation of an accelerator pedal or the like and which represents an amount of output requested by a vehicle driver of the vehicle 10, a throttle-valve opening degree θth that is an opening degree of an electronic throttle valve, a power-switch pressing signal Spw, a battery temperature THbat that is a temperature of the HEV battery 28 as an electric storage device, a battery charge/discharge current That and a battery voltage Vbat of the HEV battery 28, and an oil temperature THoil of the working fluid in the hydraulic control circuit 52. The power switch 84 is an automatic-reset-type push-button switch disposed in vicinity of a driver's seat of the vehicle 1, and is to be pressed by the vehicle driver to output the power-switch pressing signal Spw when driving of the vehicle 10 is to be started or finished. The power switch 84 is used to establish a ready ON state in which the driving is enabled, an accessory ON state in which various accessory products are enabled, an a ready OFF state in which the driving by the power sources (the engine 12 and the electric motor MG) is disabled, for example.

The electronic control apparatus 90 outputs an engine control command signal Se for controlling the engine 12, an MG control command signal Smg for controlling the electric motor MG, an electric-hydraulic-pump control command signal Seop for controlling the electric hydraulic pump 60, a CB hydraulic-pressure control command signal Scb for controlling the engagement devices CB, a K0 hydraulic-pressure control command signal Sk0 for controlling the K0 clutch 34 and a WSC hydraulic-pressure control command signal Swsc for controlling the WSC clutch 36, to various devices provided in the vehicle 10, such as the engine control device 22, the WSC, the PCU 24 and the hydraulic control circuit 52. The hydraulic control circuit 52 is provided with various solenoid valves for switching fluid passages and controlling hydraulic pressure in accordance with the K0 hydraulic control command signal Sk0, the CB hydraulic control command signal Scb and the WSC hydraulic control command signal Swsc.

The electronic control apparatus 90 functionally includes a power-source control portion 92, a shift control portion 94 and a limp-home-running control portion 96, in order to realize the various controls in the vehicle 10.

The power-source control portion 92 calculates a requested drive amount of the vehicle 10 requested by the vehicle driver, for example, by applying the accelerator opening degree θacc and the vehicle running speed V to a requested drive amount map that represents a pre-stored relationship obtained by experimentation or determined by an appropriate design theory, namely, a predetermined relationship for obtaining the requested drive amount. The requested drive amount is, for example, a requested drive torque Trdem [Nm], a requested drive force Frdem [N], or a requested drive power Prdem [W] of the drive wheels 14. The power-source control portion 92 calculates a requested input torque Tidem in the transmission input shaft 50 capable of realizing the requested drive amount, by taking account of a transmission loss, an auxiliary load, the gear ratio γat of the automatic transmission 38, a chargeable electric power Win and a dischargeable electric power Wout of the HEV battery 28, for example, and obtains a target engine torque Tetgt and a target MG torque Tmtgt that make it possible to obtain the requested input torque Tidem. Then, the power-source control portion 92 outputs the engine control command signal Se for controlling the engine 12 so as to output the target engine torque Tetgt, and also the MG control command signal Smg for controlling the electric motor MG so as to output the target MG torque Tmtgt. The chargeable electric power Win and the dischargeable electric power Wout of the HEV battery 28 are calculated by the electronic control apparatus 90, based on, for example, the battery temperature THbat and a state of charge SOC [%] of the HEV battery 28. The state of charge SOC of the HEV battery 28 is a value indicating a charged state of the HEV battery 28, i.e., an amount of the power stored in the HEV battery 28, and can be calculated based on, for example, a battery charge/discharge current Ibat and a battery voltage Vbat.

For example, when the requested input torque Tidem can be covered only by an output of the electric motor MG, the power-source control portion 92 establishes a BEV (Battery Electric Vehicle) running mode that is a motor running mode in which the vehicle 10 runs by driving the electric motor MG only by the electric power from the HEV battery 28. In the BEV running mode, the engine 12 is stopped, with the K0 clutch 34 being released and with the WSC clutch 36 being engaged to perform a BEV running using only the electric motor MG as the power source. In the BEV running mode, the MG torque Tmg is controlled so as to realize the requested input torque Tidem. On the other hand, when the requested input torque Tidem cannot be covered without using at least an output of the engine 12, the power-source control portion 92 establishes an HEV (Hybrid Electric Vehicle) mode that is an engine running mode. In the HEV running mode, both the K0 clutch 34 and the WSC clutch 36 are engaged to perform an engine running using at least the engine 12 as the power source, i.e., an HEV running. In the HEV running mode, the engine torque Te is controlled so as to realize all or a part of the requested input torque Tidem, and the MG torque Tmg is controlled so as to compensate for a torque portion insufficient by the engine torque Te with respect to the requested input torque Tidem.

Figure 4:
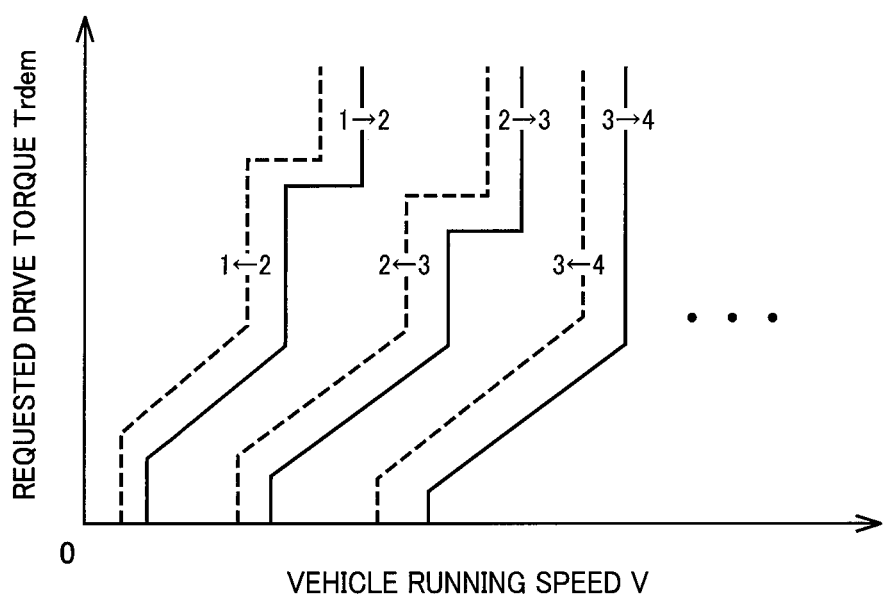
FIG. 4 is a view for explaining an example of a shift map for automatically changing the gear positions of the automatic transmission by a shift control portion functionally provided in the electronic control apparatus shown in FIG. 1.

The shift control portion 94 determines whether the automatic transmission 38 is to be shifted or not, for example, by using a shift map that is a predetermined relationship, and outputs the CB hydraulic-pressure control command signal Scb to the hydraulic control circuit 52 for switching the gear position Gr of the automatic transmission 38 as necessary. FIG. 4 is an example of the shift map, in which the requested drive torque Trdem and the vehicle running speed V are defined as variables, and each of solid lines is an upshift line for determining an upshift, and each of broken lines is a downshift line for determining a downshift. The shift map is determined such that the higher the vehicle running speed V or the lower the requested drive torque Trdem is, the higher the gear position Gr providing a lower gear ratio γat is, and the lower the vehicle running speed V or the higher the requested drive torque Trdem is, the lower the gear position Gr proving having a higher speed ratio γat is. When a manual shift operation member such as a shift lever is operated by the vehicle driver and a shift instruction signal such as upshift and downshift is supplied to the shift control portion 94, the shift control portion 94 executes a manual shift control for switching the forward gear position Gr of the automatic transmission 38 in accordance with the shift instruction. Numbers "1" to "4" in FIG. 4 mean a first speed gear position "1st" to a fourth speed gear position "4th", and shift lines related to the fifth speed gear position "5th" to the eighth speed gear position "8th" are not shown in FIG. 4. The vehicle running speed V shown in FIG. 4 may be replaced with the output rotational speed No, for example. The requested drive torque Trdem shown in FIG. 4 may be replaced with the requested drive force Frdem or the accelerator opening degree θacc.

Figure 5:
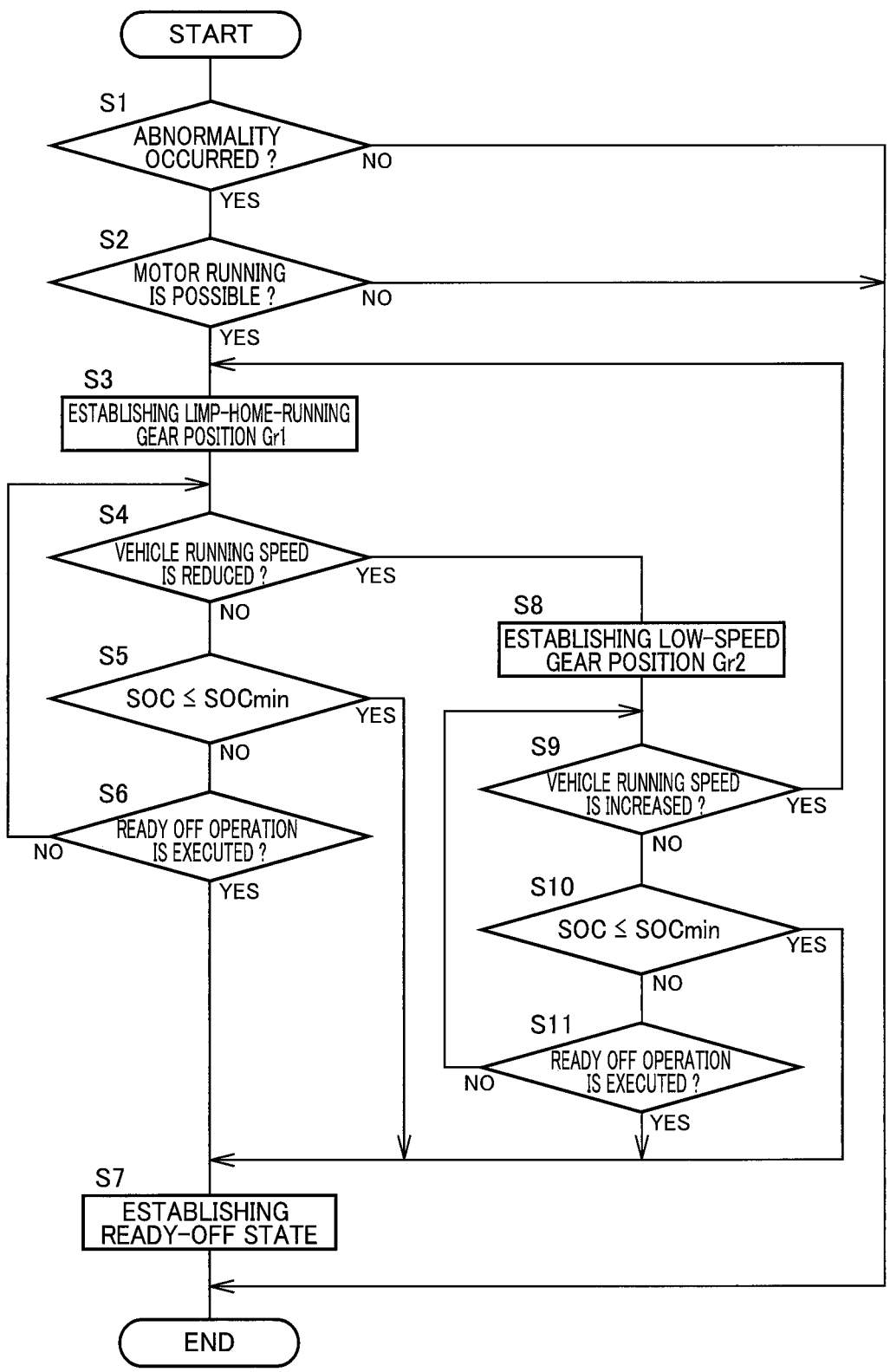
FIG. 5 is a flowchart for explaining an operation of a limp-home-running control portion functionally provided in the electronic control device shown in FIG. 1.

The limp-home-running control portion 96 causes the vehicle 10 to perform a limp-home running so as to extend a cruising distance of the vehicle 10 by causing the vehicle 10 to perform the motor running in event of occurrence of an abnormality such as a failure of the engine 12. To be specific, the limp-home-running control portion 96 performs the limp-home running in accordance with a control routine including steps S1 to S11, which is shown in a flowchart of FIG. 5. In the flowchart of FIG. 5, "YES" and "NO" in each of determination steps S1, S2, S4-S6 and S9-S11 (represented by rhombus shapes) mean affirmative determination and negative determination, respectively.

At step S1 of FIG. 5, the limp-home-running control portion 96 determines whether or not the abnormality including the failure of the engine 12 has occurred. When the abnormality has occurred, the limp-home-running control portion 96 implements step S2, but when the abnormality has not occurred, the limp-home-running control portion 96 terminates one cycle of execution of the control routine because there is no need to perform the limp home travel. The occurrence of the abnormality includes at least an abnormality in which the engine 12 cannot be used as the power source, such as a failure of the engine 12, the K0 clutch 34 or the WSC clutch 36. The failure of the engine 12 can be determined from, for example, a change in the rotational speed Ne or rotational acceleration of the engine 12 with respect to the target engine torque Tetgt calculated by the power-source control portion 92. The failure of the K0 clutch 34 is a failure of a solenoid valve of the hydraulic control circuit 52 or the like, and can be determined from, for example, a difference between the engine rotational speed Ne and the MG rotational speed Nmg at the time of engagement control of the K0 clutch 34. A failure of the WSC clutch 36 can be determined based on the control state and the differential rotation between the front and rear wheels. A failure by which shifting of the automatic transmission 38 is limited, that is, a failure in which a predetermined gear position Gr cannot be established due to a failure of a solenoid valve of the hydraulic control circuit 52 or the like affects running of the vehicle 10 using the engine 12 as the power source, so that such a failure can be also included in the abnormality determined at step S1.

Figure 6:
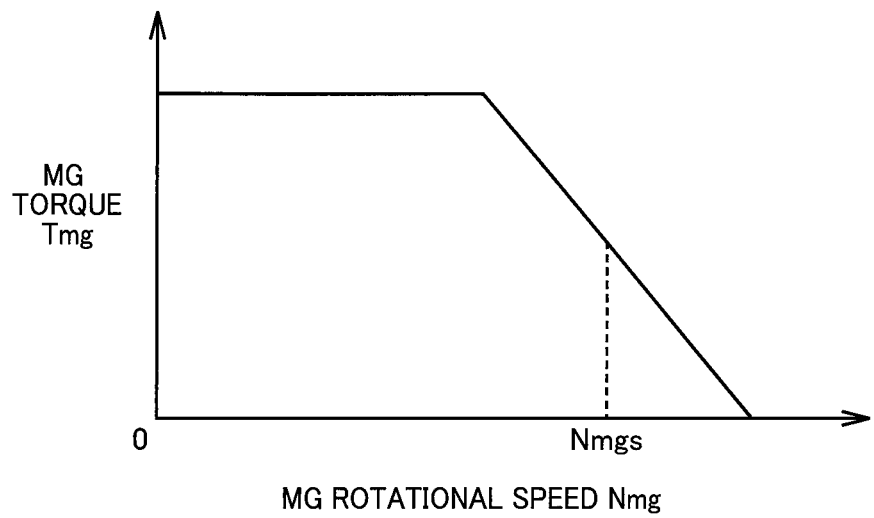
FIG. 6 is a view showing torque characteristics of an electric motor provided in the vehicle of FIG. 1.
Figure 7:
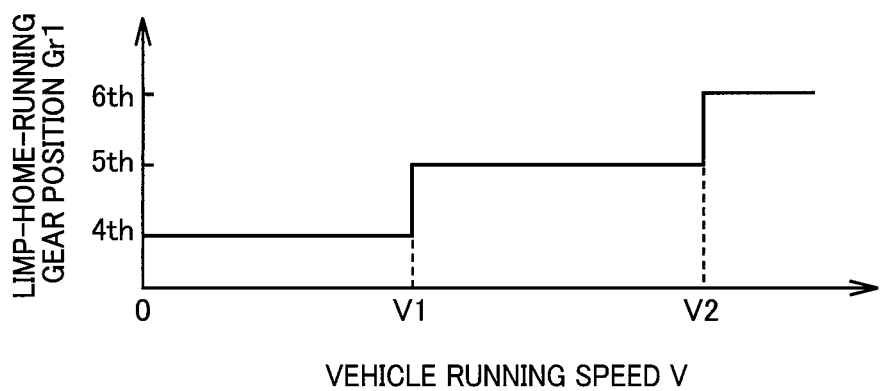
FIG. 7 is a view showing an example of a predetermined relationship for determining a limp-home-running gear position Gr1 based on a running speed V of the vehicle at step S3 shown in the flowchart of FIG. 5.

At step S2, the limp-home-running control portion 96 determines whether or not the motor running is possible, in the present embodiment, whether or not the BEV running mode is possible, based on the content of the abnormality determined at step S1. For example, in a case in which the motor running is impossible such as a case in which the WSC clutch 36 is out of order, one cycle of execution of the control routine is terminated. However, in a case in which the motor running is possible, step S3 and the subsequent steps are implemented, so that a limp-home running control is executed whereby the electric motor MG is operated by the power supplied from the HEV battery 28 to perform a limp-home running of the vehicle 10. At step S3, a limp-home-running gear position Gr1 is established as a predetermined constant gear position Gr of the automatic transmission 38 during the limp-home running. That is, since a torque characteristic of the electric motor MG is little affected by the MG rotational speed Nmg as shown in FIG. 6, it is possible to perform running, starting and the like of the vehicle 10 without shifting of the automatic transmission 38. In the present embodiment, for example, as shown in FIG. 7, the limp-home-running gear position Gr1 is set according to the vehicle running speed V at that time, and the limp-home running is performed with the gear position fixed to the limp-home-running position Gr1 regardless of the subsequent change in the vehicle running speed V and the change in the requested drive torque Trdem. In an example shown in FIG. 7, the fourth speed gear position 4th is set as the limp-home running gear position Gr1 when the vehicle running speed V is lower than a first speed value V1 (V<V1), the fifth speed gear position 5th is set as the limp-home running gear position Gr1 when the vehicle running speed V is not lower than the first speed value V1 and is lower than a second speed value V2 (V1≤V<V2), and the sixth speed gear position 6th is set as the limp-home running gear position Gr1 when the vehicle running speed V is not lower than the second speed value V2 (V2≤V), such that the limp-home running gear position Gr1 is maintained without depending on the shift map shown in FIG. 4. The first and second speed values V1 and V2 are gear-position determination speed values, and are set in advance such that, for example, in FIG. 6, the MG rotation speed Nmg is maintained at a predetermined upper limit determination value Nmgs or less. The type and number of the limp-home running gear position Gr1 are determined as appropriate. Although the limp-home running gear position Gr1 may be set to a predetermined gear position that is fixed regardless of the vehicle running speed V, the limp-home running gear position Gr1 is set to a gear position that is variable depending on the vehicle running speed V, because a low-speed gear position Gr providing a high gear ratio γat is suitable as a gear position capable of providing a driving force that enables start and acceleration of the vehicle 10 even at a low running speed of the vehicle 10, and, if the vehicle running speed V at the time of transition to the limp-home running is high on a highway or the like, the electric motor MG is likely to be rotated at an excessively high speed or an upper limit of the MG torque Tmg is likely to be reduced.

Then, in step S4, it is determined whether or not the vehicle running speed V has been reduced to a predetermined low-speed determination value Vlo or less. When the vehicle running speed V is higher than the low-speed determination value Vlo (V>Vlo), the control flow goes to step S5. When the vehicle running speed V is not higher than the low-speed determination value Vlo (V≤Vlo), the control flow goes to step S8. In the present embodiment in which the mechanical hydraulic pump 58 and the electric hydraulic pump 60 are provided, the mechanical hydraulic pump 58 is connected to the motor connection shaft 48, so as to discharge the working fluid by being rotationally driven by the engine 12 and the electric motor MG. Therefore, when the vehicle running speed V is reduced and the MG rotational speed Nmg is reduced, a rotational speed of the mechanical hydraulic pump 58 is also reduced whereby an amount of the discharged working fluid is reduced. In order to engage the WSC clutch 36 and maintain the gear position Gr (i.e., the limp-home running gear position Gr1) in the automatic transmission 38, a predetermined engagement hydraulic pressure is required. Therefore, when the amount of the working fluid discharged from the mechanical hydraulic pump 58 is reduced, it is necessary to compensate for the reduction by the electric hydraulic pump 60, so that the cruising distance could be reduced by consumption of the electric power by the electric hydraulic pump 60. In order to suppress the reduction of the cruising distance, when the MG rotational speed Nmg becomes equal to or less than a predetermined low-rotational-speed determination value Nmglo at which the amount of the working fluid discharged from the mechanical hydraulic pump 58 becomes equal to or less than a certain amount, step S8 is implemented to downshift the automatic transmission 38 and increase the MG rotational speed Nmg. That is, the low-speed determination value Vlo is set to a speed value at which the MG rotational speed Nmg becomes equal to or lower than the low-rotational-speed determination value Nmglo in accordance with the gear ratio γat of the limp-home-running gear position Gr1 at that time. In other words, the low-speed determination value Vlo is set to a speed value that varies depending on the gear ratio γat of the limp-home-running gear position Gr1.

When the vehicle running speed V is higher than the low-speed determination value Vlo (V>Vlo), namely, when a negative determination is made at step S4, the control flow goes to step S5 that is implemented to determine whether or not the state of charge SOC of the HEV battery 28 has become equal to or less than a predetermined lower limit value SOCmin. The lower limit value SOCmin is a value of the state of charge SOC at which there is a possibility that the electric motor MG could not be appropriately operated or the HEV battery 28 could be damaged. When the state of charge SOC is not higher than the lower limit value SOCmin (SOC≤SOCmin), step S7 is immediately implemented to stop supply of the power to the electric motor MG and bring the electric motor MG into a ready-OFF state. When the state of charge SOC is higher than the lower limit value SOCmin (SOC>SOCmin), step S6 is implemented to determine whether or not an operation for establishing the ready OFF state has been executed by operation of the power switch 84. When the ready-OFF operation has been executed, step S7 is implemented to bring the vehicle 10 into the ready-OFF state. When the ready-OFF operation has not been executed, step S4 and the subsequent steps are repeatedly implemented to fix the automatic transmission 38 to the limp-home-running gear position Gr1 as the predetermined constant gear position Gr and to perform the limp-home running of the vehicle 10.

When the vehicle running speed V becomes equal to or lower than the low-speed determination value Vlo and an affirmative determination (YES) is made at step S4 during the limp-home running that is performed by repeatedly implementing step S4 and the subsequent steps, step S8 is implemented to downshift the automatic transmission 38 to a low-speed gear position Gr2 as another predetermined constant gear position providing a higher gear ratio γat than the limp-home-running gear position Gr1. The low-speed gear position Gr2 is for increasing the MG rotational speed Nmg corresponding to the rotational speed of the mechanical hydraulic pump 58 so as to delay start of operation of the electric hydraulic pump 60 or so as to suppress an increase in the amount of the working fluid discharged from the electric hydraulic pump 60. The low-speed gear position Gr2 is suitably, for example, the second speed gear position 2nd or the third speed gear position 3rd. As a result, the power consumption by the electric hydraulic pump 60 is suppressed, and the cruising distance during limp-home running can be extended.

At step S9, it is determined whether or not the vehicle running speed V has been increased to a predetermined increase determination value Vup or higher. When the vehicle running speed V is lower than the increase determination value Vup (V<Vup), step S10 and the subsequent steps are implemented. When the vehicle running speed V becomes not lower than the increase determination value Vup (V≥Vup), step S3 and the subsequent steps are implemented. The increase determination value Vup is set to a running speed value which is sufficiently higher than the low-speed determination value Vlo and at which, for example, the MG rotational speed Nmg exceeds the upper limit determination value Nmgs in the low-speed gear position Gr2 of the automatic transmission 38. Seps S10 and S11, which are implemented when a negative determination is made at step S9, are the same as steps S5 and S6, respectively. When the state of charge SOC is not higher than the lower limit value SOCmin (SOC≤SOCmin), and when the ready-OFF operation has been executed, step S7 is implemented to bring the vehicle 10 into the ready-OFF state. When the state of charge SOC is higher than the lower limit value SOCmin (SOC>SOCmin) and the ready-OFF operation has not been executed, step S9 and subsequent steps are repeatedly implemented to fix the automatic transmission 38 to the low-speed gear position Gr2 as the another predetermined constant gear position and to continue the limp-home running of the vehicle 10 using the electric motor MG. On the other hand, when the vehicle running speed V becomes not lower than the increase determination value Vup (V≥Vup), step S3 is implemented to newly establish the limp-home-running gear position Gr1 as the predetermined constant gear position Gr of the automatic transmission 38 that is dependent on the vehicle running speed V at that time. Then, the automatic transmission 38 is fixed to the newly established limp-home-running gear position Gr1, and the limp-home running using the electric motor MG is continued.

As described above, according to the limp-home-running control portion 96 functionally provided in the electronic control apparatus 90 of the present embodiment, during the limp-home running in which the electric motor MG is operated by the electric power supplied from the HEV battery 28, the gear position Gr of the automatic transmission 38 is limited to the limp-home-running gear position Gr1 or the low-speed gear position Gr2 to suppress the shifting of the automatic transmission 38. Therefore, it is possible to reduce the power consumption caused by the control of the rotational speed of the electric motor MG for suppressing the shifting shock or the like, and accordingly to extend the cruising distance of the vehicle 10 by an amount corresponding to the reduction of the power consumption.

When the vehicle running speed V is higher than the low-speed determination value Vlo, the vehicle runs with the automatic transmission 38 being fixed to the limp-home-running gear position Gr1. Therefore, it is possible to reduce consumption of the electric power due to control of the rotational speed of the electric motor MG at the time of the shifting of the automatic transmission 38, and to extend the cruising distance. On the other hand, at a low running speed of the vehicle 10 at which the vehicle running speed V is equal to or lower than the low-speed determination value Vlo, the automatic transmission 38 is downshifted to the low-speed gear position Gr2 providing the gear ratio γat higher than that of the limp-home-running gear position Gr1, whereby the rotational speed Nmg of the electric motor MG is increased by the downshifting of the automatic transmission 38 in spite of the low running speed of the vehicle 10, so that it is possible to increase the amount of the working fluid discharged by the mechanical hydraulic pump 58 that is rotationally driven by the electric motor MG. As a result, the operation of the electric hydraulic pump 60 can be suppressed by the increase of the amount of the working fluid discharged by the mechanical hydraulic pump 58, so that it is possible to extend the cruising distance by reduction of the power consumption by the electric hydraulic pump 60.

Although the automatic transmission 38 is downshifted to the low-speed gear position Gr2 at a low running speed of the vehicle 10 with the vehicle running speed V being not higher than the low-speed determination value Vlo (V≤Vlo) in the above-described embodiment, steps S4, S8 to S11 relating to the low-speed gear position Gr2 can be omitted as shown in a flowchart of FIG. 8 which is for explaining another embodiment of the present invention. That is, regardless of a decrease of the vehicle running speed V or a stop of the vehicle 10, it is possible to perform the limp-home running of the vehicle 10 using the electric motor MG by fixing the gear position of the automatic transmission 38 to the limp-home-running gear position Gr1 at step S3.

Although the embodiments of the present invention have been described in detail with reference to the drawings, the embodiments are merely embodiments, and the present invention can be carried out with various modifications and improvements based on the knowledge of those skilled in the art.

NOMENCLATURE OF ELEMENTS

10: vehicle
12: engine
14: drive wheel
18: power transmission apparatus (power transmission path)
28: HEV battery (power storage device)
38: automatic transmission
52: hydraulic control circuit
58: mechanical hydraulic pump
60: electric hydraulic pump
62: pump drive motor
90: electronic control apparatus (control apparatus)
96: limp-home-running control portion
MG: electric motor
Gr1: limp-home-running gear position
Gr2: low-speed gear position
V: vehicle running speed

What is claimed is:
1. A control apparatus for a vehicle that includes a drive wheel, an engine and an electric motor as power sources for driving the vehicle, and an automatic transmission which is provided in a power transmission path between the power sources and the drive wheel and which is configured to selectively establish a plurality of gear positions providing respective different gear ratios, wherein the control apparatus comprises a limp-home-running control portion configured, in event of a failure of the engine, to cause the vehicle to perform a limp-home running, by operating the electric motor with a power supplied from a power storage device, and wherein the limp-home-running control portion is configured, when causing the vehicle to perform the limp-home running, to restrict shifting of the automatic transmission for changing the gear positions of the automatic transmission.

2. The control apparatus according to claim 1,
wherein the limp-home-running control portion is configured, when causing the vehicle to perform the limp-home running, to cause the vehicle to run with a limp-home-running gear position as a predetermined constant gear position being established in the automatic transmission.

3. The control apparatus according to claim 1,
wherein the vehicle includes a hydraulic control circuit having a mechanical hydraulic pump to be driven by the electric motor and an electric hydraulic pump to be driven by a pump drive motor that is provided exclusively for driving the electric hydraulic pump, wherein the limp-home-running control portion is configured, when a running speed of the vehicle is higher than a predetermined low-speed determination value during the limp-home running, to cause the vehicle to run with a limp-home-running gear position as a predetermined constant gear position being established in the automatic transmission, and wherein the limp-home-running control portion is configured, when the running speed of the vehicle becomes not higher than the predetermined low-speed determination value during the limp-home running, to downshift the automatic transmission to a low-speed gear position as another predetermined constant gear position providing a higher gear ratio than the limp-home-running gear position.

* * * * *